United States Patent
Maguire et al.

(10) Patent No.: US 8,736,230 B2
(45) Date of Patent: May 27, 2014

(54) SYSTEM AND METHOD FOR REBALANCING MODULES OF A BATTERY DURING VEHICLE OPERATION

(75) Inventors: Patrick Maguire, Ann Arbor, MI (US); Bob Taenaka, Plymouth, MI (US); Jacob Mathews, Canton, MI (US); Ronald Elder, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 979 days.

(21) Appl. No.: 12/433,437

(22) Filed: Apr. 30, 2009

(65) Prior Publication Data

US 2009/0206793 A1 Aug. 20, 2009

Related U.S. Application Data

(63) Continuation of application No. 11/161,333, filed on Jul. 29, 2005, now abandoned.

(51) Int. Cl.
*H02J 7/00* (2006.01)

(52) U.S. Cl.
USPC .......................................................... 320/118

(58) Field of Classification Search
USPC ................... 320/118, 117, 119, 132; 324/427
See application file for complete search history.

(56) References Cited

U.S. PATENT DOCUMENTS

| | | | |
|---|---|---|---|
| 5,504,415 A | 4/1996 | Podrazhansky et al. | |
| 5,550,445 A * | 8/1996 | Nii | 318/153 |
| 5,764,027 A | 6/1998 | Harvey | |
| 5,786,640 A | 7/1998 | Sakai et al. | |
| 5,828,201 A | 10/1998 | Hoffman, Jr. et al. | |
| 5,869,950 A | 2/1999 | Hoffman, Jr. et al. | |
| 5,905,360 A | 5/1999 | Ukita | |
| 6,204,636 B1 | 3/2001 | Kinoshita et al. | |
| 6,518,732 B2 * | 2/2003 | Palanisamy | 320/147 |
| 6,686,724 B2 | 2/2004 | Coates et al. | |
| 6,962,224 B2 * | 11/2005 | Nakanowatari | 180/65.225 |
| 2003/0218447 A1 | 11/2003 | Coates et al. | |
| 2005/0077877 A1 | 4/2005 | Cawthorne | |
| 2005/0093508 A1 * | 5/2005 | Taniguchi et al. | 320/104 |
| 2005/0099162 A1 * | 5/2005 | Ding | 320/141 |
| 2005/0285445 A1 | 12/2005 | Wruck et al. | |
| 2006/0022643 A1 | 2/2006 | Brost et al. | |
| 2006/0033468 A1 | 2/2006 | Zhu et al. | |
| 2006/0097698 A1 | 5/2006 | Plett | |

* cited by examiner

*Primary Examiner* — Arun Williams
(74) *Attorney, Agent, or Firm* — David B. Kelley; Brooks Kushman P.C.

(57) ABSTRACT

A system and method for rebalancing a battery in a vehicle during vehicle operation, the battery including a plurality of modules, is provided. The method may include determining when an automatic rebalance mode start condition is satisfied, modifying a target state of charge for the battery at least in part in response to the start condition being satisfied such that the target state of charge is raised from a standard operating value to a rebalance value, operating the vehicle with the target state of charge at the rebalance value, determining when an automatic rebalance mode end condition or an interrupt condition is satisfied, and modifying the target state of charge in response to the automatic rebalance mode end condition or the interrupt condition being satisfied such that the target state of charge is lowered from the rebalance value to the standard operating value.

19 Claims, 3 Drawing Sheets

SYSTEM AND METHOD FOR REBALANCING MODULES OF A BATTERY DURING VEHICLE OPERATION

This application is a continuation of application Ser. No. 11/161,333, filed Jul. 29, 2005 now abandoned, which is hereby incorporated by reference in its entirety.

BACKGROUND OF THE INVENTION

1. Field of the Invention

This invention relates to a system and method for rebalancing a battery during vehicle operation.

2. Background Art

Conventional electric (EV), hybrid electric (HEV), and fuel cell (FC) vehicles generally include one or more batteries. Each battery is generally composed of a plurality of electrochemical cells (i.e., cells) combined in series to produce a potential. The smallest unit (i.e., grouping) of cells for which a state of charge (SOC) may be determined is generally referred to as a module.

The cells and/or modules of the battery are generally matched by capacities and voltages during the battery fabrication process. The fabrication process may also include charging and discharging the battery to confirm that all module voltages are within a specified tolerance at all voltage levels. The assembly process generally provides a battery having module voltages within a few milli-volts of one another.

Over time, ambient conditions and/or charging/discharging the battery during vehicle operation may result in differences among the individual SOC of the cells ($SOC_{Cell}$). The $SOC_{Cell}$ variations are generally observed as divergence in module voltages (i.e., states of charge) since a module is generally the smallest grouping (i.e., unit) of cells for which a state of charge (SOC) may be determined.

Conventionally, the batteries are controlled between predefined minimum and maximum SOC limits to prevent over-discharge and over-charge of any cell within the battery. When a module approaches the minimum SOC limit, the battery discharge current is driven to zero. When a module approaches the maximum SOC limit, the battery charge current is driven to zero. Thus, any divergence among SOC modules may reduce the operating range of the battery which may, in turn, result in reduced battery performance and a reduced battery life. Accordingly, it is generally desirable to rebalance the battery when a divergence among module SOC is identified.

Conventional methods for rebalancing the battery (i.e., reducing or eliminating module SOC divergence) require low-rate constant-current overcharge of the cells/modules. Such low-rate constant-current overcharge generally requires precise control of charge current (e.g., 1 to 2 Amperes) and may require a long period of time (e.g., 5 hours or more) to complete.

Conventional hybrid and fuel cell vehicle charge-control systems are generally not configured to control the charge current within the conventional rebalancing range during vehicle operation. Furthermore, during recharging of the cells (i.e., battery recharging), the vehicle may experience decreased operating performance (e.g., poor vehicle acceleration, reduced fuel economy, etc.). The decreased vehicle performance may result in a vehicle operator perceiving different or unusual vehicle behavior.

Conventional recharging of a pure electric vehicle generally rebalances the cells of the EV battery. Such rebalancing of EV batteries is generally possible because the vehicle is plugged into a steady power supply (e.g., the United States power grid) and allowed to slowly charge to a full SOC during EV recharging. The slow charging process inherently rebalances the SOC of the cells. However, rapid EV recharge techniques are under development which may reduce the inherent rebalancing of an EV battery during EV recharging. Accordingly, purely electric vehicles may also require a system and method for rebalancing a battery during vehicle operation.

Therefore, a system and method for rebalancing a battery (i.e., the cells of the battery, the modules of the battery, etc.) during vehicle operation may be desirable. Furthermore, a system and method for rebalancing a battery during vehicle operation that reduces and/or eliminates recharge related vehicle performance degradation and/or improves control of the charge current may be desirable.

SUMMARY OF THE INVENTION

Accordingly, one or more embodiments of the present invention may provide a system and/or method for rebalancing a battery during vehicle operation that reduces and/or eliminates recharge related vehicle performance degradation and/or improves control of the charge current during battery rebalancing.

In at least one embodiment of the present invention, a method for rebalancing a battery in a vehicle during vehicle operation, the battery including a plurality of modules, is provided. The method may include determining when an automatic rebalance mode start condition is satisfied, modifying a target state of charge for the battery at least in part in response to the start condition being satisfied such that the target state of charge is raised from a standard operating value to a rebalance value, operating the vehicle with the target state of charge at the rebalance value, determining when an automatic rebalance mode end condition or an interrupt condition is satisfied, and modifying the target state of charge in response to the automatic rebalance mode end condition or the interrupt condition being satisfied such that the target state of charge is lowered from the rebalance value to the standard operating value.

In at least one other embodiment of the present invention, a system for rebalancing a battery in a vehicle during vehicle operation is provided. The system may include a battery having a plurality of modules wherein each of the modules includes one or more cells, and a controller in electronic communication with the battery. The controller may determine when an automatic rebalance mode start condition is satisfied, modify a target state of charge for the battery at least in part in response to the start condition being satisfied such that the target state of charge is raised from a standard operating value to a rebalance value, determine when an automatic rebalance mode end condition or an interrupt condition is satisfied, and modify the target state of charge in response to the end condition or the interrupt condition being satisfied such that the target state of charge is lowered from the rebalance value to the standard operating value.

DETAILED DESCRIPTION OF THE PREFERRED EMBODIMENT(S)

Figure 1:
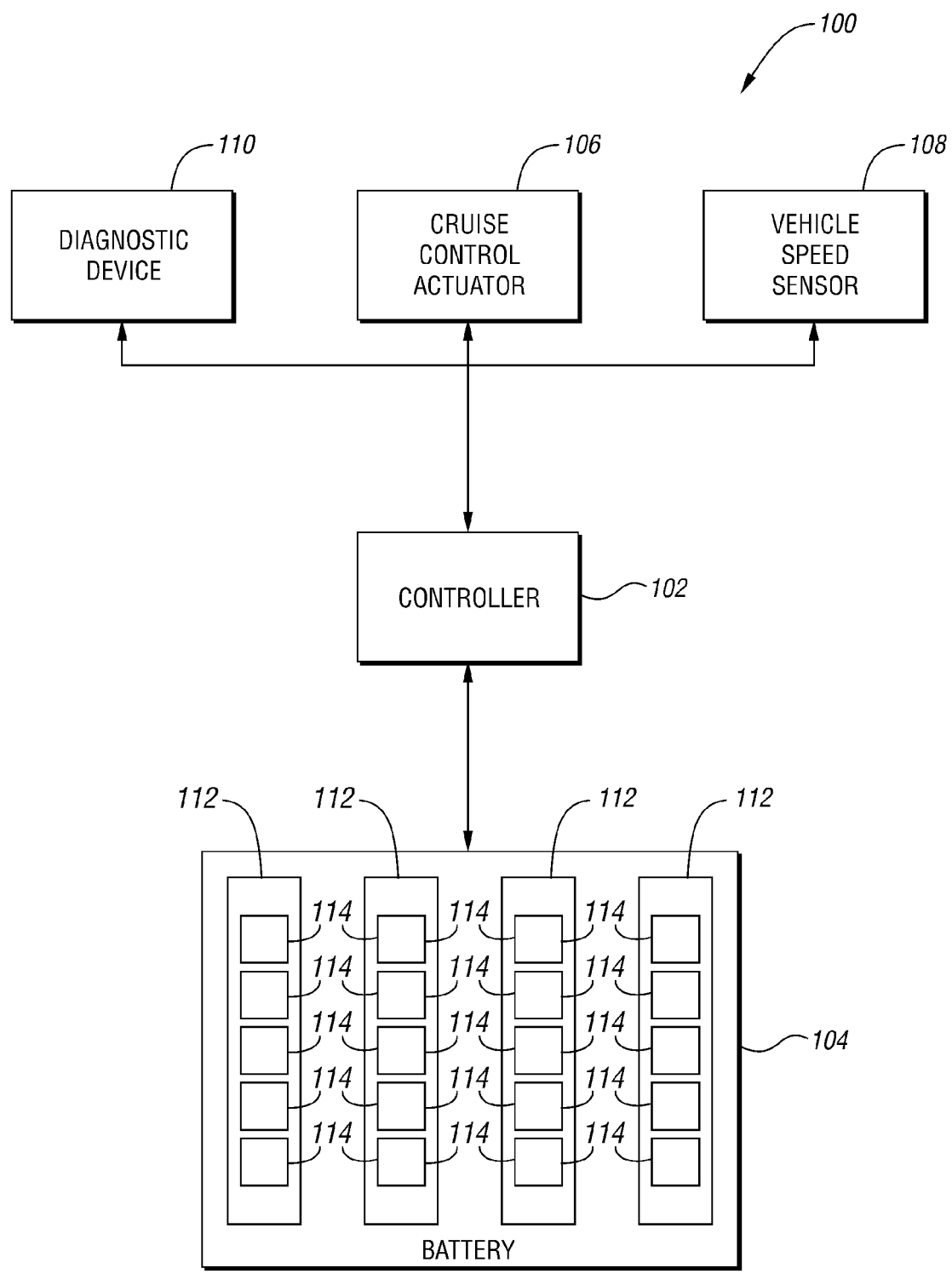
FIG. 1 is a block diagram illustrating a system for rebalancing a battery in a vehicle during vehicle operation according to one embodiment of the present invention.

Referring to FIG. 1, a block diagram illustrating a system 100 for rebalancing a battery in a vehicle (i.e., electric vehicle, hybrid electric vehicle, fuel cell vehicle, etc.) during vehicle operation according to one embodiment of the present invention is shown. The system may include a controller 102, a battery 104, a cruise control actuator 106, a vehicle speed sensor 108, and/or a diagnostic device 110.

The controller 102 may be electronically coupled to the battery 104, the cruise control actuator 106, the vehicle speed sensor 108 and/or the diagnostic device 110 such that electronic signals may be transmitted between the controller 102 and one or more components (i.e., 104, 106, 108, 110) of the system 100. In general, the controller 102 may include a processor and/or other electronic device (e.g., an Application Specific Integrated Circuit and/or the like) which executes software application programs, executes firmware, and/or which performs other logical exercises. In at least one embodiment of the present invention, the controller 102 may execute the method 200 described in detail in connection with FIG. 2.

It is contemplated that all or part of the functionality of the controller 102 may be incorporated into a single controller as shown in FIG. 1, such as a vehicle system controller (VSC). Alternatively, the functionality of the controller 102 may be distributed among a plurality of controllers (not shown). Controller inputs and outputs (i.e., electronic signals) may be received and passed between controllers via a Controller Area Network (CAN), dedicated communication wires, and the like.

The battery 104 generally includes one or more modules 112. Similarly, each module 112 may include one or more cells (e.g., electrochemical cells) 114 for storing energy and producing a potential. A module 112 is generally the smallest unit (i.e., grouping) of cells 114 for which a state of charge (SOC) may be determined by the system 100.

In the exemplary embodiment shown in FIG. 1, the battery 104 includes four modules 112 and each module 112 further includes five cells 114. In at least one other embodiment of the present invention, each module 112 may include a single (i.e., only one) cell 114 such that the number of modules 112 is equal to the number of cells 114. However, the battery 104 may include any appropriate quantity of modules 112 and each module 112 may further include any appropriate quantity of cells 114 to meet the design criteria of a particular application. Furthermore, in at least one embodiment of the present invention, each module 112 includes the same number of cells 114 (e.g., each module 112 of FIG. 1 includes five cells 114). However, it is contemplated by the present invention that a first module 112 may include more or less cells 114 than a second module 112 to meet the design criteria of a particular application.

In at least one embodiment of the present invention, the cruise control actuator 106 is a switch and/or other device (not shown) electronically coupled to the controller 102 for transmitting a vehicle constant speed control request from an operator (not shown).

In at least one other embodiment of the present invention, the cruise control actuator 106 may include a speed control controller (not shown), a switch, and/or other device for controlling the vehicle to a constant target speed (i.e., cruise control setpoint, speed control setpoint, etc.). In such an embodiment, the cruise control actuator 106 may be electronically coupled to the controller 102 for providing an indication (e.g., electronic signal) that the vehicle is operating in a constant speed control mode (i.e., cruise control mode) and/or for providing a signal corresponding to the speed control setpoint. However, the cruise control actuator 106 may be any appropriate device or group of devices for engaging a vehicle constant speed control mode (i.e., for placing the vehicle in a cruise control mode).

The vehicle speed sensor 108 may be any device capable of determining directly and/or indirectly the speed of a vehicle to which the battery 104 is electronically coupled. The vehicle speed sensor 108 is generally electronically coupled to the controller 102 and/or the cruise control actuator 106 for providing a signal corresponding to the vehicle speed.

The diagnostic device 110 may be any device capable of electronically coupling to one or more components (e.g., 102, 104, 106, 108) of the system 100 for performing diagnostic (i.e., troubleshooting, evaluation, etc.) functions, such as a hand held computer, a hardware based device, and the like.

Figure 2:
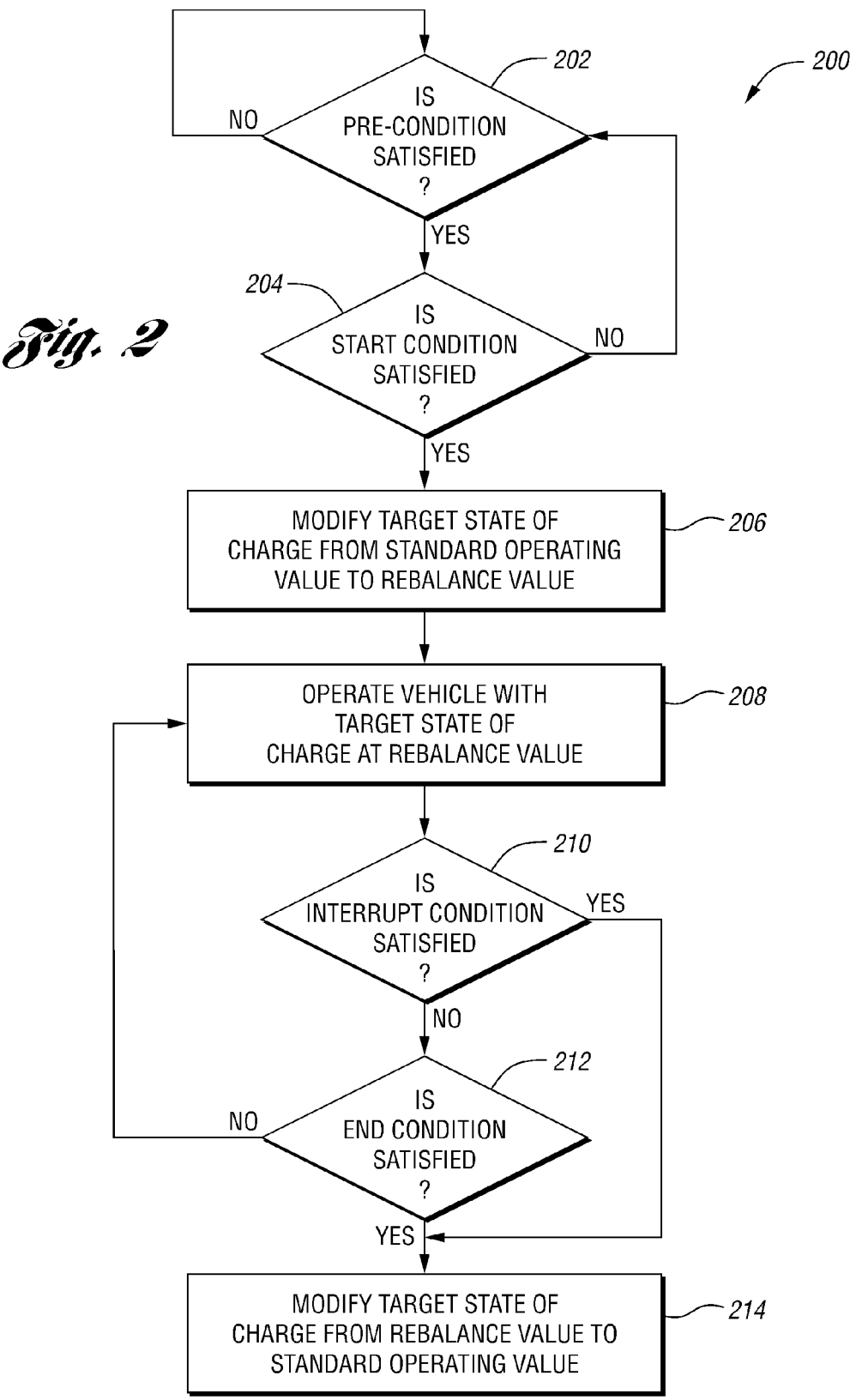
FIG. 2 is a flow diagram of a method for rebalancing a battery in a vehicle during vehicle operation according to one embodiment of the present invention.

Referring to FIG. 2, a flow diagram of a method 200 for rebalancing a battery in a vehicle during vehicle operation according to one embodiment of the present invention is shown. The method 200 may be advantageously implemented in connection with the system 100, described previously in connection with FIG. 1, and/or any appropriate system to meet the design criteria of a particular application. The method 200 generally includes a plurality of blocks or steps (e.g., 202, 204, 206, 208, 210, 212, 214) that may be performed serially. As will be appreciated by one of ordinary skill in the art, the steps of the method 200 may be performed in at least one non-serial (or non-sequential) order, and one or more steps may be omitted to meet the design criteria of a particular application.

Decision block 202 generally determines (i.e., detects, identifies, etc.) when a pre-condition is satisfied. When satisfaction of the pre-condition is detected (i.e., the YES leg of decision block 202), the method may proceed to decision block 204. Otherwise, the method generally remains at decision block 202 (i.e., the NO leg of decision block 202).

In one exemplary embodiment of the present invention, the pre-condition may be satisfied when the vehicle is operating in a cruise control mode (i.e., constant speed control mode). In general, vehicle power demand is relatively constant for a vehicle operating in a constant speed control mode, as compared with a vehicle not operating at a constant speed. Accordingly, satisfying the pre-condition when the vehicle is in a cruise control mode may provide improved control over the rebalancing charge current. Improved control over the rebalancing charge current may also provide a decrease in battery heating during the rebalancing process. In at least one embodiment of the present invention, a cruise control actuator (e.g., 106) may place the vehicle in the cruise control mode in response to a vehicle operator (i.e., operator) initiated command.

In another exemplary embodiment of the present invention, the pre-condition may be satisfied when the vehicle is operating in a cruise control mode for a predetermined duration of time (e.g., the pre-condition may be satisfied when the vehicle has been operating in a cruise control mode for one or more minutes). By delaying satisfaction of the pre-condition until the vehicle has operated in cruise control mode for a predetermined duration, the probability that the method 200 will operate to completion once started may be increased. Such increased probability may result from an increased probability that the operator intends the vehicle to remain in cruise control mode once the operator has allowed the vehicle to operate in cruise control mode for the predetermined duration of time.

In yet another exemplary embodiment of the present invention, decision block 202 further includes the step of determining a speed of the vehicle (i.e., vehicle speed). The vehicle speed may be determined using any appropriate device and/or algorithm to meet the design criteria of a particular application, such as a vehicle speed sensor (e.g., 108), a signal from a cruise control actuator (e.g., 106) corresponding to a speed control setpoint, and the like. Furthermore, the pre-condition may be satisfied when the vehicle is operating in a cruise control mode and the speed is greater than or equal to a predetermined minimum cruise speed ($SPEED_{min}$) and less than or equal to a predetermined maximum cruise speed ($SPEED_{max}$). In at least one embodiment of the present invention, $SPEED_{min}$ may equal 40 miles per hour and $SPEED_{max}$ may equal 85 miles per hour. In at least one other embodiment of the present invention, $SPEED_{min}$ may equal 45 miles per hour and $SPEED_{max}$ may equal 75 miles per hour. However $SPEED_{min}$ and $SPEED_{max}$ may equal any appropriate values to meet the design criteria of a particular application. It may be observed that the probability of the vehicle remaining in a cruise control mode may be a function of the speed at which the vehicle is operating. For example, an operator who has set the cruise control mode to control the speed of the vehicle to 35 miles per hour is likely to be operating the vehicle on city streets (i.e., requiring frequent stops). In contrast, an operator who has set the cruise control mode to control the speed of the vehicle to 65 miles per hour is likely to be operating the vehicle on a highway (i.e., requiring few stops). Accordingly, by delaying satisfaction of the pre-condition until the vehicle is operated at a speed within the range of $SPEED_{min}$ and $SPEED_{max}$, the probability that the method 200 will operate to completion once started may be increased.

In still yet another embodiment of the present invention, the pre-condition is satisfied when the vehicle is operating in a cruise control mode for a predetermined duration, the speed is greater than or equal to a predetermined minimum cruise speed, and the speed is less than or equal to a predetermined maximum cruise speed.

The above exemplary embodiments are illustrative and non-limiting. Accordingly, the pre-condition may be satisfied in response to any appropriate stimulus (e.g., action, occurrence, signal, trigger, and the like) to meet the design criteria of a particular application. Furthermore, decision block 202 may be omitted to meet the design criteria of a particular application.

Decision block 204 generally determines when an automatic rebalance mode start condition (i.e., start condition) is satisfied. When satisfaction of a start condition is detected (i.e., the YES leg of decision block 204), the method may proceed to step 206. Otherwise, the method generally returns to decision block 202 (i.e., the NO leg of decision block 204).

In one exemplary embodiment of the present invention, decision block 204 further includes the steps of determining a throughput for the battery (i.e., battery throughput, the absolute value of charge and discharge current integrated over a period of time) since the last successful rebalance of the battery (i.e., since it is determined that an automatic rebalance mode end condition is satisfied), determining a SOC for each module (i.e., module SOCs) when the vehicle is operating with a target state of charge for the battery (i.e., a desired average of the module SOCs, a target average of the module SOCs) at (i.e., set equal to) a standard operating value (e.g., 50%), and determining a maximum SOC ($SOC_{mod,max}$) and minimum SOC ($SOC_{mod,min}$) from the module SOCs. As previously stated in connection with FIG. 1, a module is generally the smallest grouping of cells for which a SOC may be determined. Accordingly, each module SOC represents one or more cell SOCs. A controller (e.g., 102) and/or other electronic device may be electronically coupled to the battery (e.g., 104) for performing one or more of the steps of the method 200. The start condition may be satisfied when a difference between $SOC_{mod,max}$ and $SOC_{mod,min}$ is greater than or equal to a predetermined upper delta limit ($\Delta_{UL}$) and/or the battery throughput is greater than or equal to a predetermined minimum throughput value ($TPV_{min}$). In at least one embodiment of the present invention, $\Delta_{UL}$ may be substantially equal to 10% and/or $TPV_{min}$ may be substantially equal to (i.e., approximately) 1800 Amp Hours.

In another exemplary embodiment of the present invention, decision block 204 further includes the step of determining the battery throughput since the last successful rebalance of the battery (i.e., since satisfaction of the automatic rebalance mode end condition), and the start condition is generally satisfied when the battery throughput is greater than or equal to a predetermined minimum throughput threshold ($TPT_{min}$), such as 3600 Amp Hours.

In yet another exemplary embodiment of the present invention, decision block 204 further includes the step of determining a discharge power for the battery (i.e., battery discharge power) and the start condition may be satisfied when the battery discharge power is less than or equal to a predetermined lower discharge limit ($DC_{LL}$).

In still yet another exemplary embodiment of the present invention, the start condition may be satisfied by a command (i.e., signal, electronic signal) from a diagnostic device (e.g., 110), such as a diagnostic device used by a service technician.

The above exemplary embodiments are illustrative and non-limiting. Accordingly, the start condition may be satisfied in response to any appropriate stimulus (e.g., action, occurrence, signal, trigger, and the like) to meet the design criteria of a particular application.

At step 206, the target SOC (i.e., the desired average of the module SOCs), is modified such that the target SOC is raised (i.e., moved, increased, etc.) from a standard operating value (e.g., 50%) to a rebalance value (e.g., 80%). In at least one embodiment of the present invention, the modification is performed gradually such as by using a ramp function, a logarithmic function, and the like (i.e., a non-step function). As will be discussed in connection with FIG. 3b, the rebalance value may correspond generally to a point on the SOC v. Charge Efficiency Curve where the charge efficiency begins to decline rapidly.

At step 208, the vehicle is operated with the target SOC at the rebalance value. When the vehicle is operating at the rebalance value, the discharge efficiency of each battery module is generally equal. However, the charge efficiency is generally lower for modules having a SOC near $SOC_{mod,max}$. Accordingly, when the system (e.g., 100) is charging the battery (e.g. 104), modules (e.g., 112) near $SOC_{mod,min}$ are generally charged more than modules near $SOC_{mod,max}$. Such unequal charging generally decreases the difference between $SOC_{mod,max}$ and $SOC_{mod,min}$.

In at least one embodiment of the present invention, the period of time required to rebalance the battery (e.g., duration of step 208) may be reduced by initiating (i.e., performing) a plurality of battery pulses (i.e., pulsing the battery). Each battery pulse generally includes the steps of charging (e.g., rapidly charging) the battery to a predetermined charge pulse value and subsequently discharging the battery to a predetermined discharge pulse value or zero pulse value. Pulsing the battery may be particularly beneficial when vehicle demand on the battery is low since low vehicle demand may result in infrequent charging and discharging of the battery.

Furthermore, pulsing the battery may reduce thermodynamic inefficiencies of the rebalance process, thereby enabling more complete rebalance with less total heat generation and concomitant energy losses. Such embodiments may provide pulse charging at higher currents where charge efficiencies are greater for some electrochemical systems (e.g., a nickel-metal hydride battery system). Such embodiments may also provide electrochemical discharging of a portion of charge side-reaction products which would otherwise have to chemically recombine to form heat (e.g., oxygen with hydrogen in a nickel-metal hydride battery system).

Decision block 210 generally determines (i.e., detects, identifies, etc.) when an automatic rebalance mode interrupt condition (i.e., interrupt condition) is satisfied. When satisfaction of an interrupt condition is detected (i.e., the YES leg of decision block 210), the method may proceed to step 214. Otherwise, the method generally falls through to decision block 212 (i.e., the NO leg of decision block 210).

In one exemplary embodiment of the present invention, decision block 210 further includes the step of determining a cell temperature for one or more cells of the battery. A controller and/or other electronic device may be electronically coupled to the battery for determining cell temperatures. The interrupt condition may be satisfied when the cell temperature for one or more cells is determined to be greater than a predetermined maximum cell temperature and/or less than a predetermined minimum cell temperature. The temperature of one or more cells may be measured indirectly by measuring the temperature of a module including the one or more cells. Accordingly, the interrupt condition may be satisfied when the temperature for one or more modules is determined to be greater than a predetermined maximum cell temperature and/or less than a predetermined minimum cell temperature.

In another exemplary embodiment of the present invention, decision block 210 further includes the step of determining cell temperatures for a plurality of cells of the battery (i.e., determining a plurality of cell temperatures). A controller and/or other electronic device may be electronically coupled to the battery for determining each cell temperature. The interrupt condition may be satisfied when a difference between a first cell temperature and a second cell temperature is greater than or equal to a predetermined temperature delta value. The temperature of one or more cells may be measured indirectly by measuring the temperature of a module including the one or more cells. Accordingly, the interrupt condition may be satisfied when a difference between a first module temperature and a second module temperature is greater than or equal to the predetermined temperature delta value.

In yet another exemplary embodiment of the present invention, the interrupt condition may be satisfied when the step of operating the vehicle with the target state of charge at the rebalance value (i.e., step 208) is performed for a predetermined maximum time (i.e., the method 200 times out).

The above exemplary embodiments are illustrative and non-limiting. Accordingly, the interrupt condition may be satisfied in response to any appropriate stimulus (e.g., action, occurrence, signal, trigger, and the like) to meet the design criteria of a particular application.

Decision block 212 generally determines (i.e., detects, identifies, etc.) when an automatic rebalance mode end condition (i.e., end condition) is satisfied. When satisfaction of an end condition is detected (i.e., the YES leg of decision block 212), the method may proceed to step 214. Otherwise, the method generally returns to step 208 (i.e., the NO leg of decision block 212).

In one exemplary embodiment of the present invention, decision block 212 further includes the step of determining battery throughput when the vehicle is operating with the target state of charge at the rebalance value (i.e., when the vehicle is operating in step 208). The end condition may be satisfied when the battery throughput is greater than or equal to a predetermined maximum throughput value ($TPV_{max}$).

In another exemplary embodiment of the present invention, decision block 212 further includes the steps of determining a SOC for each module (i.e., module SOCs) when the vehicle is operating with a target state of charge at a rebalance value, and determining a maximum SOC ($SOC_{mod,max}$) and minimum SOC ($SOC_{mod,min}$) from the module SOCs. As previously stated in connection with FIG. 1, a module is generally the smallest grouping of cells for which a SOC may be determined. Accordingly, each module SOC represents one or more cell SOCs. A controller (e.g., 102) and/or other electronic device may be electronically coupled to the battery (e.g., 104) for performing one or more of the steps of the method 200. The end condition may be satisfied when a difference between $SOC_{mod,max}$ and $SOC_{mod,min}$ is less than or equal to a predetermined lower delta limit ($\Delta_{LL}$).

The above exemplary embodiments are illustrative and non-limiting. Accordingly, the end condition may be satisfied in response to any appropriate stimulus (e.g., action, occurrence, signal, trigger, and the like) to meet the design criteria of a particular application.

At step 214, the target SOC, is modified such that the target SOC is lowered (i.e., moved, decreased, etc.) from the rebalance value (e.g., 80%) to the standard operating value (e.g., 50%). In at least one embodiment of the present invention, the modification is performed gradually such as by using a ramp function, a logarithmic function, and the like (i.e., a non-step function). In at least one other embodiment of the present invention, the modification is performed gradually in response to satisfaction of an end condition and the modification is performed rapidly in response to satisfaction of an interrupt condition. However, the modification may be performed using any appropriate function (e.g., step function, non-step function, ramp function, etc.) in response to any appropriate trigger (e.g., satisfaction of an end condition, satisfaction of an interrupt condition) to meet the design criteria of a particular application.

It is contemplated by the present invention that the target state of charge may be a discrete value, such as 50%, or a range of values, such as 48%-52%. Accordingly, the standard operating value and/or the rebalance value may be a discrete value or a range of values.

Referring to FIGS. 3 (a-c), charge efficiency versus SOC curves corresponding to various steps of a method (e.g., the method 200) for rebalancing a battery in a vehicle during vehicle operation according to one embodiment of the present invention are provided. As illustrated in FIGS. 3 (a-c), one or more limits may be established about the target state of charge (i.e., target SOC). The one or more limits may be implemented in connection with any appropriate system (e.g., the system 100) and/or method (e.g., the method 200) to meet the design criteria of a particular application. A minimum SOC limit ($SOC_{min}$) may represent a minimum threshold below which the system and/or method will not discharge the battery when a module SOC is below the minimum threshold. Similarly, a maximum SOC limit ($SOC_{max}$) may represent a maximum threshold above which the system and/or method will not charge the battery when a module SOC is above the maximum threshold. The minimum threshold and maximum threshold may protect the battery from damage caused by operating the battery in an undercharge and/or overcharge state.

Figure 3A:
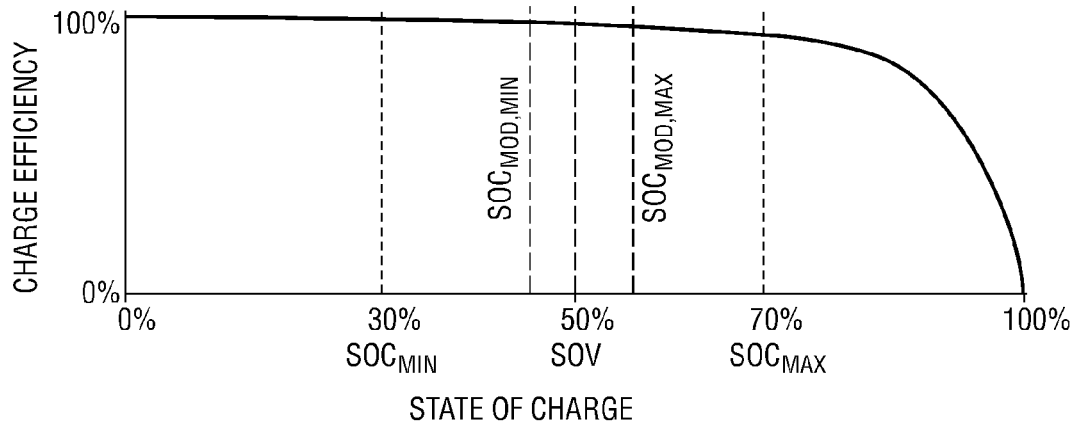
FIGS. 3 (*a-c*) are charge efficiency versus SOC curves corresponding to various steps of a method for rebalancing a battery in a vehicle during vehicle operation according to one embodiment of the present invention.

FIG. 3a generally represents a vehicle operating at a target SOC equal to a standard operating value (i.e., SOV) of 50% (e.g., a vehicle operating in step 204 of method 200). In the exemplary embodiment shown in FIG. 3a, the minimum threshold (i.e., $SOC_{min}$, minimum standard SOC limit) is set to 30% and the maximum threshold (i.e., $SOC_{max}$, maximum standard SOC limit) is set to 70%. Accordingly, the vehicle, via one or more controllers such as a vehicle control system, will not discharge the battery when any module SOC (i.e., average SOC of the cells of a module) is below 30%. Similarly, the vehicle will not charge the battery when any module SOC is above 70%.

Figure 3B:
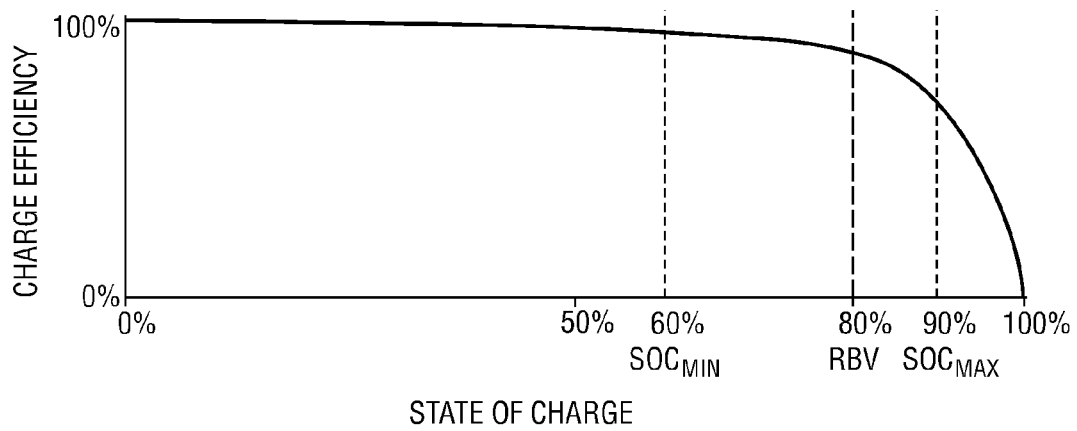

FIG. 3b generally represents a vehicle operating at a target SOC equal to a rebalance value (i.e., RBV) of 80% (e.g., a vehicle operating in step 208 of method 200). In the exemplary embodiment shown in FIG. 3b, the minimum threshold (i.e., $SOC_{min}$, minimum rebalance SOC limit) has been increased to 60% and the maximum threshold (i.e., $SOC_{max}$, maximum standard SOC limit) has been increased to 90%. Accordingly, the vehicle, via one or more controllers such as a vehicle control system, will not discharge the battery when any module SOC is below 60%. Similarly, the vehicle will not charge the battery when any module SOC is above 90%.

In at least one embodiment of the present invention, the minimum threshold may be increased by the difference between the rebalance value and the standard operating value such that the amount of discharge power available to the vehicle during rebalance is substantially maintained. In at least one other embodiment of the present invention, the minimum threshold may be held constant (i.e., not modified, not raised, not lowered etc.), such as at 30%. In contrast, the maximum threshold is generally increased such that the maximum threshold is only slightly greater than (i.e., greater than but substantially near) the rebalance value. By increasing the maximum threshold during rebalance as described, the probability of damaging the battery via overcharging may be reduced. However, the minimum and maximum thresholds may be set to any appropriate values to meet the design criteria of a particular application.

Figure 3C:
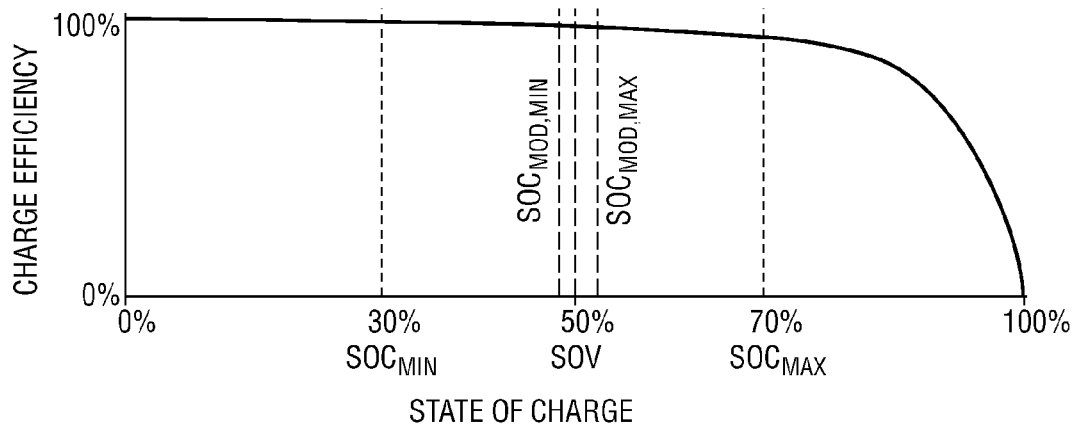

FIG. 3c generally represents a vehicle operating at a target SOC equal to a standard operating value of 50% after successful completion of a rebalance sequence (e.g., a vehicle operating in step 214 of method 200). The FIG. 3c is substantially similar to the FIG. 2a with the exception that the module SOCs have been rebalanced such that the difference between $SOC_{mod,max}$ and $SOC_{mod,min}$ is reduced.

In accordance with various embodiments of the present invention, the methods described herein are intended for operation as software and/or firmware running on a processor and/or other electronic device. Dedicated hardware implementations including, but not limited to, Application Specific Integrated Circuits, programmable logic arrays and other hardware devices can likewise be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Accordingly, one or more embodiments of the present invention may provide a system and/or method for rebalancing a battery during vehicle operation that reduces and/or eliminates recharge related vehicle performance degradation and/or improves control of the charge current during battery rebalancing. In particular, one or more embodiments of the present invention may provide a system and method for rebalancing a battery during vehicle operation while substantially maintaining vehicle fuel efficiency and/or vehicle responsiveness.

While the best mode for carrying out the invention has been described in detail, those familiar with the art to which this invention relates will recognize various alternative designs and embodiments for practicing the invention as defined by the following claims.

What is claimed:

1. A power system for a vehicle comprising:
a vehicle battery including a plurality of modules; and
a controller configured to cause a target operating state of charge of the vehicle battery to be increased if a rebalance start condition is satisfied such that a state of charge of each of the modules increases and differences in the state of charge among the modules decreases.

2. The system of claim 1 wherein the controller is further configured to determine a state of charge of each of the modules and wherein the rebalance start condition is satisfied if the difference between a maximum and minimum of the states of charge of the modules exceeds a predetermined threshold.

3. The system of claim 1 wherein the controller is further configured to determine a throughput for the vehicle battery and wherein the rebalance start condition is satisfied if the throughput exceeds a predetermined threshold.

4. The system of claim 1 wherein the controller is further configured to determine a discharge power for the vehicle battery and wherein the rebalance start condition is satisfied if the discharge power is less than a predetermined threshold.

5. The system of claim 1 wherein the controller is further configured to cause a target operating state of charge of the vehicle battery to be increased if a vehicle operating pre-condition is satisfied.

6. The system of claim 5 wherein the controller is further configured to determine whether the vehicle is operating in a cruise control mode and wherein the vehicle operating pre-condition is satisfied if the vehicle is operating in the cruise control mode.

7. The system of claim 5 wherein the controller is further configured to determine a speed of the vehicle and wherein the vehicle operating pre-condition is satisfied if the speed of the vehicle is greater than a minimum speed threshold and less than a maximum speed threshold.

8. The system of claim 1 wherein the controller is further configured to cause the target operating state of charge of the battery to be decreased if a rebalance end condition is satisfied.

9. The system of claim 8 wherein the controller is further configured to determine a temperature associated with each of the modules and wherein the rebalance end condition is satisfied if any of the temperatures are greater than a maximum threshold temperature or less than a minimum threshold temperature.

10. The system of claim 8 wherein the controller is further configured to determine a temperature associated with each of the modules and wherein the rebalance end condition is satisfied if the difference between a maximum and minimum of the temperatures associated with the modules is greater than a predetermined threshold.

11. The system of claim 8 wherein the controller is further configured to determine a duration of time during which the controller causes the target operating state of charge of the vehicle battery to be increased and wherein the rebalance end condition is satisfied if the duration of time exceeds a predetermined threshold.

12. The system of claim 8 wherein the controller is further configured to determine a throughput for the vehicle battery and wherein the rebalance end condition is satisfied if the throughput exceeds a predetermined threshold.

13. The system of claim 8 wherein the controller is further configured to determine a state of charge of each of the modules and wherein the rebalance end condition is satisfied if the difference between a maximum and minimum of the states of charge of the modules is less than a predetermined threshold.

14. The system of claim 8 wherein the controller is further configured to cause the target operating state of charge of the vehicle battery to be decreased in a ramp-like manner.

15. The system of claim 1 wherein the controller is further configured to cause the target operating state of charge of the vehicle battery to be increased to charge the modules in a pulse-wise manner.

16. The system of claim 1 wherein the controller is further configured to cause the target operating state of charge of the vehicle battery to be increased in a ramp-like manner.

17. A method for charging a vehicle battery including a plurality of modules, the method comprising:

determining whether a battery rebalance start condition is satisfied; and causing a target operating state of charge of the vehicle battery to be increased if the rebalance start condition is satisfied such that a state of charge of each of the modules increases and differences in the state of charge among the modules decreases.

18. The method of claim 17 further comprising determining whether a battery rebalance end condition is satisfied, wherein the controller is further configured to cause the target operating state of charge of the vehicle battery to be decreased if the rebalance end condition is satisfied.

19. A vehicle comprising:

a battery configured to provide power to move the vehicle and including a plurality of modules; and a controller configured to selectively cause a target operating state of charge of the battery to be increased such that each of the modules is charged at a rate that depends on the state of charge of the module and that differences in the states of charge among the modules decreases.

* * * * *